Aug. 11, 1953 — N. VAN VOORHIS — 2,648,160
SOUND-MAKING WHEELED STICK HORSE
Filed March 30, 1950
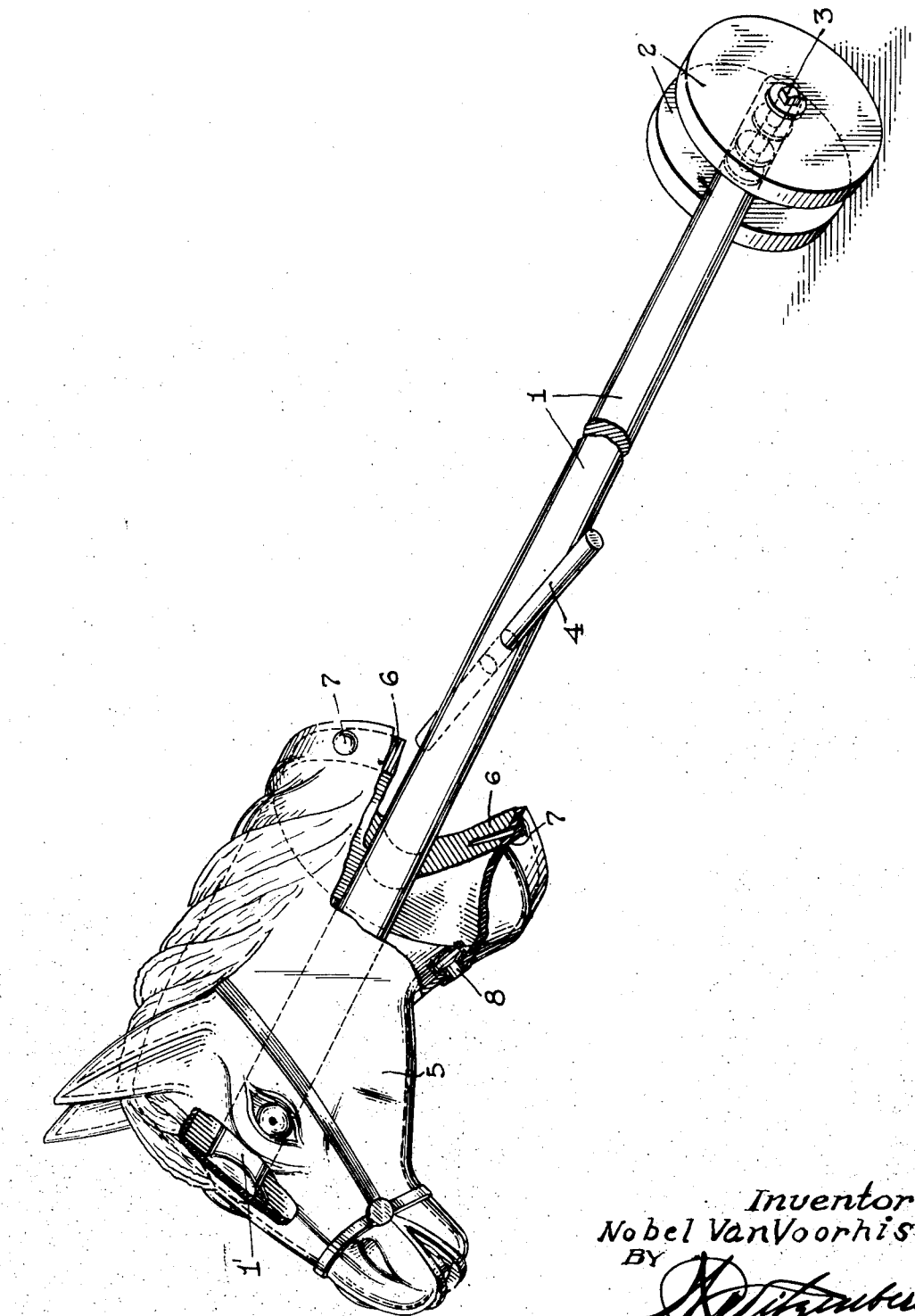
Inventor
Nobel VanVoorhis
BY
Attorney Patented Aug. 11, 1953

2,648,160

UNITED STATES PATENT OFFICE 2,648,160

SOUND-MAKING WHEELED STICK HORSE

Noble Van Voorhis, Los Angeles, Calif.

Application March 30, 1950, Serial No. 152,851

1 Claim. (Cl. 46—98)

This invention relates to sound-making wheeled stick horse, and more particularly to a sound-making toy in the form of a stick having a head mounted thereon, with the stick extended fully into said head to give strength and protection against separating said head from the end of the stick.

Among the salient objects of the invention are: to provide a sound-making toy in which a soft flexible moulded head of an animal is mounted on the end of a riding stick for a child, the end of the stick being extended through a base block and fully into the front part of the head to give strength and protection to the head; to provide such a natural looking head with a sound-making element in its wall to be actuated when said head, which is hollow, is squeezed or bent around the end of said stick, the principal invention being in the formation of a full rounded natural head of an animal, hollow to contain air, and having a sound-making element in its wall to respond when said hollow head is squeezed.

Other features of the toy will be apparent from the accompanying drawing showing the toy with a horse head mounted on the stick, and with little wheel elements at its lower end.

Referring in detail to the drawing, a riding stick 1 is shown provided at its lower end with two wheel elements 2, 2, at opposite sides of the end, to turn on an axle, as 3, in a well known manner. Said stick having a handle bar 4 therethrough for the child to hold on to.

The head here shown is that of a horse, designated as a whole 5, having a base or neck block 6, around which the hollow neck of said horse is secured, as by means of tacks 7, 7, or other suitable means. The stick 1 is extended fully into the head and to the forehead of the horse, as at 1', whereby to give more firmness, strength and constitute a protection to prevent the head from sagging or being deformed.

Mounted in the wall of the neck portion of said head, is a sound-making element 8, which can be of a design to give the desired sound and might be an imitation of the animal whose head is used on the stick. It will be noticed that the head is full form of head, and not simply a flat form or profile; that it is hollow, even into the ears, forming an air chamber, and that when it is squeezed, the sound-making element responds to the rush of air therethrough.

I do not, however, limit the invention to the showing here made for explanatory purposes, except as I may be limited by the hereto appended claim.

I claim:

A sound-making toy horse including a horse head of soft flexible material and hollow and made to imitate the natural appearance of a horse's head, a sound-making element in the wall of said horse's head and operable to make a sound as said horse's head is compressed to force air through said sound-making element, an insert member filling the neck of said head, a riding stick inserted through said insert member and extended to the forehead of said horse's head to hold the head extended from said insert member, a wheel on the lower end of said riding stick, and a handle on said riding stick toward the horse's head and extending from opposite sides for two hands to grasp, when straddling said riding stick.

NOBLE VAN VOORHIS.

References Cited in the file of this patent

UNITED STATES PATENTS

| Number | Name | Date |
|---|---|---|
| 216,864 | Kiesele | June 24, 1879 |
| 507,851 | Shetter | Oct. 31, 1893 |
| 593,592 | Lyons | Nov. 16, 1897 |
| 650,895 | Faherty | June 5, 1900 |
| 754,148 | Kuhleman | Mar. 8, 1904 |
| 1,937,397 | Averill | Nov. 28, 1933 |
| 2,158,740 | Brinkman | May 16, 1939 |